Oct. 8, 1963  J. H. KOONTZ  3,106,416
SAFETY HOOK FOR DRILLING APPARATUS
Filed Dec. 7, 1960
FIG. I.
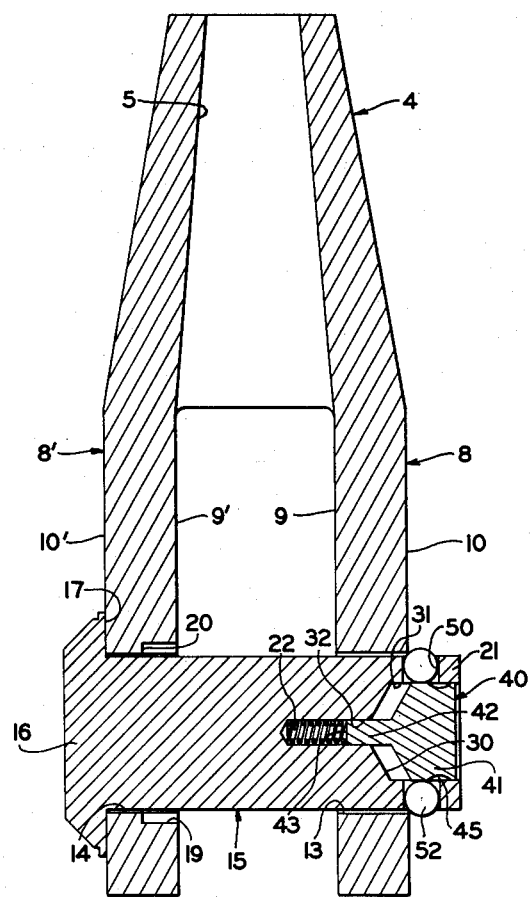
INVENTOR:
JAMES H. KOONTZ
BY *Joseph Januszkiewicz*
ATTORNEY

United States Patent Office 3,106,416
Patented Oct. 8, 1963

3,106,416
SAFETY HOOK FOR DRILLING APPARATUS
James H. Koontz, Michigan City, Ind., assignor to Joy Manufacturing Company, Pittsburgh, Pa., a corporation of Pennsylvania
Filed Dec. 7, 1960, Ser. No. 74,422
5 Claims. (Cl. 287—100)

This invention relates to a drilling apparatus and more particularly to a safety hook for the handling of drilling equipment. During a drilling operation it often becomes necessary to lift and move heavy equipment as well as hoist bits, drill collars and drill rods by means of a hook and line connection for connecting these members to suitable members or for connection to the drill string as is well understood by those skilled in the art. In order to insure the hoisting operation is completed with maximum safety, a safety hook is used to couple the hoisting line to the apparatus thus being moved. Heretofore various safety hooks have been devised to assure proper handling of drill rods and other related equipment; however, to use these hooks, it requires considerable time in opening and closing of the safety hooks.

It is a purpose of this invention to provide a safety hook that is quickly disengageable and engageable with safety features integrated therein to provide in addition thereto a quick latching means which will speed up the rod handling operations of a drilling rig as well as other similar operations.

An object of this invention is to provide a new and improved quick disconnect hook.

A further object of this invention is to provide a new and improved hook having novel spring biased operative means which locks the hook in locking position.

A further object of this invention is to provide a new and improved safety hook having a novel spring biased plunger which upon actuations cooperates with ball detents to selectively unlock or lock the hook member quickly and efficiently.

These and other objects and advantages of the invention will hereinafter more fully appear. In the accompanying drawing there is shown for the purpose of illustration one form which the invention may assume in practice.

In the drawing:

FIGURE 1 is a cross sectional view, shown in elevation, of a safety hook constructed in accordance with the principles of this invention.

In the drawing, FIGURE 1 discloses a safety hook comprising a truncated cone shaped body member 4 having a tapered bore 5 extending centrally therethrough which bore 5 tapers as it extends upwardly from the lower base portion thereof. A cable (not shown) is firmly secured to the safety hook by inserting the end thereof into the tapered bore 5 and suitably loosening the wire strands at the end thereof and pouring molten zinc thereabout as is well known and understood in the art.

Reference to downward, upward, lower and upper are used for convenience of explanation when viewing FIG. 1; however, it will be understood that the scope of the invention is not to be limited thereby and may be operated in a manner other than the directions specified.

A pair of diametrical opposed elongated spaced parallel leg members 8 and 8', which leg members are rectangular in longitudinal cross section, depend integrally downwardly from the lower base portion of the body member 4. Leg members 8 and 8' have inner side surfaces 9 and 9', respectively, parallel and facing each other, and outer side surfaces 10 and 10' respectively parallel to each other and parallel to the inner side surfaces 9 and 9'. The lower end portions of leg members 8 and 8' respectively have bores 13 and 14 respectively, which bores have a common coaxial axis that is normal to the inner and outer side surfaces thereof. Bores 13 and 14 extend through the respective leg memebrs 8 and 8' and have their axes in axial alignment. Leg member 8' has a counterbore 19 extending outwardly from inner surface 9', with the axis of counterbore 19 being coaxial with bore 14 to provide an annular abutment surface 20 at the bottom of counterbore 19 for a purpose to be described.

Slidably received and extending therethrough in the axially aligned bores 13 and 14 is a cylindrical pin 15 having an enlarged cylindrical end portion 16 which portion has an outwardly extending annular surface 17 normal to the axis of pin 15 which surface 17 abuttingly contacts the outer side surface 10' of the leg member 8'. An end portion 21 of cylindrical pin 15 protrudes outwardly beyond the outer surface 10 of the leg members 8 which end portion 21 has a stepped bore 30 extending axially inwardly therein a short distance to approximately one half the axial length of pin 15 with the axis of the stepped bore 30 being concentric to the longitudinal central axis of the cylindrical pin 15. Stepped bore 30 has an enlarged bore portion 31 extending inwardly from the outer end portion for approximately one half the depth of bore 30 with the remaining portion of stepped bore 30 being a reduced bore portion 32 to closely slidably receive a closed end helical spring 22 suitably seated at the bottom surface thereof.

A stepped cylindrical plunger 40 having an enlarged cylindrical portion 41 is slidably received by enlarged bore portion 31 which plunger 40 has a reduced end portion 42 which is slidably received by reduced bore portion 32 with the bottom end surface 43 of the reduced end portion 42 abuttingly contacting the outer end of spring 22 to be biased outwardly thereby. Suitable means are provided to limit the outward movement of plunger 40 in bore 30 such as by peening the shoulder of end portion 21 adjacent bore 30. The enlarged portion 41 of the plunger 40 has the intermediate portion thereof circumferentially recessed as at 45 at its outer surface which recess 45 is located closely adjacent the outer end portion of plunger 40 to cooperate with a locking means to be described.

The end portion 21 of pin 15 which protroudes outwardly beyond the outer surface 10 of leg member 8 has a plurality of radially extending, circumferentially spaced bores 50 which extend transversely therethrough communicating with the enlarged bore portion 31 of bore 30 wherein the axes of bores 50 are coplanar and lie normal to the longitudinal axis of bore 30. The respective radially disposed bores 50 have ball detents 52 suitably retained therein for limited radial movement as by flanging, peening, machining or spot welding the outer edges of the respective bores 50. The radial inward movement of ball detents 52 is limited by their engagement with the outer surface of the plunger 40. Ball detents 52 have a portion of their outer surface in abutting contact with a portion of the outer surface 10 which portion is closely adjacent bore 13 so that the ball detents 52 suitably lock the pin 15 to the depending leg members 8 and 8' since the ball detents 52 are retained in abutting contact with the portion of outer surface 10 by the outer surface of plunger 40.

By depressing plunger 40 relative to cylindrical pin 15 against the biasing action of spring 22 such as by the use of an external force, the circumferential recess 45 on plunger 40 is aligned with the bores 50 of cylindrical pin 15 to provide a clearance space for the free unobstructed radial inward movement of ball detents 52 upon such axial inward movement of pin 15. The ball detents 52 are cammed radially inward into recess 45 by the frictional rolling engagement of balls 52 with the wall of bore 13 of the depending leg 8 thereby permitting the release of the external force on plunger 40 to thereby permit the unrestricted axial longitudinal movement of pin 15 through bore 13 to clear the bore 13, and pin 15 is thereby free to move axially until the ball detents 52 move outwardly due to the spring biasing action of spring 22. Ball detents 52 move radially outwardly whenever the ball detents 52 clear the bore 13, thereby allowing the pin 15 to be moved further axially until the end portion 21 of the cylindrical pin is moved closely adjacent the inner surface 9' of leg member 8' wherein the ball detents 52 come into rolling contact with the annular abutting surface 20 of enlarged counterbore 19 which limits the further axial movement of pin 15. Although the end portion 21 of pin 15 is free to move axially away from counterbore 19 toward leg member 8, pin 15 is held in its position generally through manual means. In order to lock the safety hook the end portion 21 of pin 15 is moved manually axially toward leg member 9 while depressing plunger 40 against the biasing action of spring 22 to thereby provide a clearance space for the ball detents 52 in the circumferential recess 45 as previously described so that as ball detents 52 engage the inner edge of bore 13, the ball detents are cammed into the recess 45 to permit the unrestricted movement of the end portion 21 of pin 15 through bore 13 of leg member 8 while releasing the force exerted on plunger 40, so that the ball detents 52 are cammed radially outwardly by the plunger 40 into rolling contact with the outer edge of bore 13 of leg member 8 to thereby lock the cylindrical pin 15 relative to the depending leg members 8 and 8'.

It will thus be appreciated that the locking and unlocking of pin 15 provides a quick operative safe latching means by which the eye portion of a bail, swivel head, or clamp may be handled to speed up operations on a drill rig as well as in other similar operations.

While there has been disclosed above one embodiment of the invention, it will be appreciated that the invention may be practiced with other modifications without departing from the spirit or scope of the invention as set forth in the appended claims.

What I claim is:

1. A clevis or the like comprising, a member having a pair of opposed leg portions, coaxial openings extending through said leg portions, respectively, an elongated pin axially slidable through and closely received within said coaxial openings having means extending laterally therefrom at least adjacent one end thereof engageable with the outer surface of one of said leg portions to locate said pin with respect to said leg portions with a portion of said pin including the other end projecting outwardly of the outer surface of the other of said leg portions, said pin having a bore extending inwardly thereof from said other end, plunger means captively coaxially slidable in said bore, means supported by said pin for biasing said plunger outwardly with respect to said bore, said pin having at least one opening extending laterally from said bore, latching means captively movably received within said opening in said pin, said plunger having a portion of the outer surface thereof constantly engaging said latching means when said plunger is so biased outwardly to move a portion of said latching means outwardly beyond said opening in said pin, means on said outer surface to permit said portion of said latching means to move inward of said opening in said pin upon axial inward movement of said plunger, and said one leg portion having a recess extending from the inner surface thereof and from said opening therein for selectively receiving said portion of said latching means.

2. A clevis or the like comprising, a member having a pair of opposed leg portions, coaxial openings extending through said leg portions, respectively, an elongated pin axially slidable through and closely received within said coaxial openings having means extending laterally therefrom at least adjacent one end thereof engageable with the outer surface of one of said leg portions to locate said pin with respect to said leg portions with a portion of said pin including the other end projecting outwardly of the outer surface of the other of said leg portions, said pin having a bore extending inwardly thereof from said other end, plunger means captively coaxially slidable in said bore, means supported by said pin for biasing said plunger outwardly with respect to said bore, said pin having at least one opening extending laterally from said bore, latching means captively movably received within said opening in said pin, said plunger having a portion of the outer surface thereof constantly engaging said latching means when said plunger is so biased outwardly to move a portion of said latching means outwardly beyond said opening in said pin, means on said outer surface to permit said portion of said latching means to move inward of said opening in said pin upon axial inward movement of said plunger, said one leg portion having a recess extending from the inner surface thereof and from said opening therein for selectively receiving said portion of said latching means, and said recess having the bottom surface thereof located to engage said portion of said latching means with said other end of said pin being substantially flush with the inner surface of said one leg.

3. A clevis or the like comprising, a member having a pair of opposed leg portions, coaxial openings extending through said leg portions, respectively, an elongated pin axially slidable through and closely received within said coaxial openings having means extending laterally therefrom at least adjacent one end thereof engageable with the outer surface of one of said leg portions to locate said pin with respect to said leg portions with a portion of said pin including the other end projecting outwardly of the outer surface of the other of said leg portions, said pin having a bore extending inwardly thereof from said other end, plunger means captively coaxially slidable in said bore, means supported by said pin for biasing said plunger outwardly with respect to said bore, said pin having a plurality of arcuately spaced openings extending laterally from said bore, latching means captively movably received within said openings in said pin, respectively, said plunger having a portion of the outer surface thereof constantly engaging said latching means when said plunger is so biased outwardly to move portions of said latching means outwardly beyond said openings in said pin, means on said outer surface to permit said portions of said latching means to move inward of said openings in said pin upon axial inward movement of said plunger, and said one leg portion having a counterbore extending from the inner surface thereof coaxial with said opening therein for selectively receiving said portions of said latching means.

4. A clevis or the like comprising, a member having a pair of opposed leg portions, coaxial openings extending through said leg portions, respectively, an elongated pin axially slidable through and closely received within said coaxial openings having means extending laterally therefrom at least adjacent one end thereof engageable with the outer surface of one of said leg portions to locate said pin with respect to said leg portions with a portion of said pin including the other end projecting outwardly of the outer surface of the other of said leg portions, said pin having a bore extending inwardly thereof from said other end, plunger means captively coaxially slidable in said bore, means supported by said pin for biasing said plunger outwardly with respect to said bore, said pin having a plurality of arcuately spaced openings extending laterally from said bore, latching means captively movably received within said openings in said pin, respectively, said plunger having a portion of the outer surface thereof constantly engaging said latching means when said plunger is so biased outwardly to move portions of said latching means outwardly beyond said openings in said pin, means on said outer surface to permit said portions of said latching means to move inward of said openings in said pin upon axial inward movement of said plunger, said one leg portion having a counterbore extending from the inner surface thereof coaxial with said opening therein for selectively receiving said portions of said latching means, and said counterbore having the bottom surface thereof located to engage said portions of said latching means with said other end of said pin being substantially flush with the inner surface of said one leg.

5. A clevis or the like as defined in claim 3 in which said latching means comprises ball members.

References Cited in the file of this patent

UNITED STATES PATENTS

| | | |
|---|---|---|
| 140,715 | Lahman | July 8, 1873 |
| 233,281 | Reinhold et al. | Oct. 12, 1880 |

FOREIGN PATENTS

| | | |
|---|---|---|
| 717,056 | Great Britain | Oct. 20, 1954 |

OTHER REFERENCES

Weir et al.: 74,643 April 10, 1951 (vol. 645, pg. 679, O.G. 4–10–51).